United States Patent
den Hartog et al.

(10) Patent No.: US 8,442,038 B2
(45) Date of Patent: May 14, 2013

(54) METHOD AND NETWORK UNIT FOR SETTING UP A CONNECTION IN A SECOND NETWORK

(75) Inventors: Jos den Hartog, Capelle a/d Ijssel (NL); Rogier August Caspar Joseph Noldus, Goirle (NL)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 932 days.

(21) Appl. No.: 12/096,339

(22) PCT Filed: Dec. 7, 2005

(86) PCT No.: PCT/NL2005/050065
§ 371 (c)(1),
(2), (4) Date: Sep. 8, 2008

(87) PCT Pub. No.: WO2007/067034
PCT Pub. Date: Jun. 14, 2007

(65) Prior Publication Data
US 2009/0073963 A1   Mar. 19, 2009

(51) Int. Cl.
*H04L 12/56*   (2006.01)
(52) U.S. Cl.
USPC .................. 370/353; 455/433; 455/435.2
(58) Field of Classification Search .......... 370/352–356, 370/410, 522; 379/32.03, 221.08–221.11, 379/265.09; 455/422.1, 433–435.2
See application file for complete search history.

(56) References Cited

U.S. PATENT DOCUMENTS

| 7,533,174 | B1 * | 5/2009 | Lynch et al. ................... 709/227 |
| 7,894,593 | B2 * | 2/2011 | Garcia-Martin et al. 379/221.01 |
| 2001/0055379 | A1 * | 12/2001 | Mamiya et al. .......... 379/201.05 |
| 2004/0122901 | A1 * | 6/2004 | Sylvain ......................... 709/206 |
| 2005/0165719 | A1 * | 7/2005 | Greenspan et al. ............... 707/1 |
| 2008/0316998 | A1 * | 12/2008 | Procopio et al. ............... 370/352 |

FOREIGN PATENT DOCUMENTS

| WO | WO 2004/077717 A | 9/2004 |
| WO | WO 2005/101858 A | 10/2005 |

OTHER PUBLICATIONS

Rosenberg, J., SIP: Session Initiation Protocol, The Internet Society, Request for Comments 3261 (2002).*
3rd Generation Partnership Project, Technical Specification 23.cde v.0.1.0; Combining CS and IMS services (Release 7) (Feb. 2005).*

* cited by examiner

*Primary Examiner* — Kibrom T Hailu
*Assistant Examiner* — Benjamin Lamont

(57) ABSTRACT

Method and network unit for setting up a connection in a second network (16) from a first user terminal (21) to a second user terminal (22), when a connection in a first network (15) is present between the first user terminal (21) and at least the second user terminal (22). The connection in the second network (16) is initiated using a context dependent second network address, the context dependent second network address identifying a combinational service in the second network (16). The combinational service comprises retrieving the second network address of the second terminal (22) using a common part (17) of the first and second network (15, 16), and completing the set up of the second connection using the second network address of the second terminal (22).

14 Claims, 1 Drawing Sheet

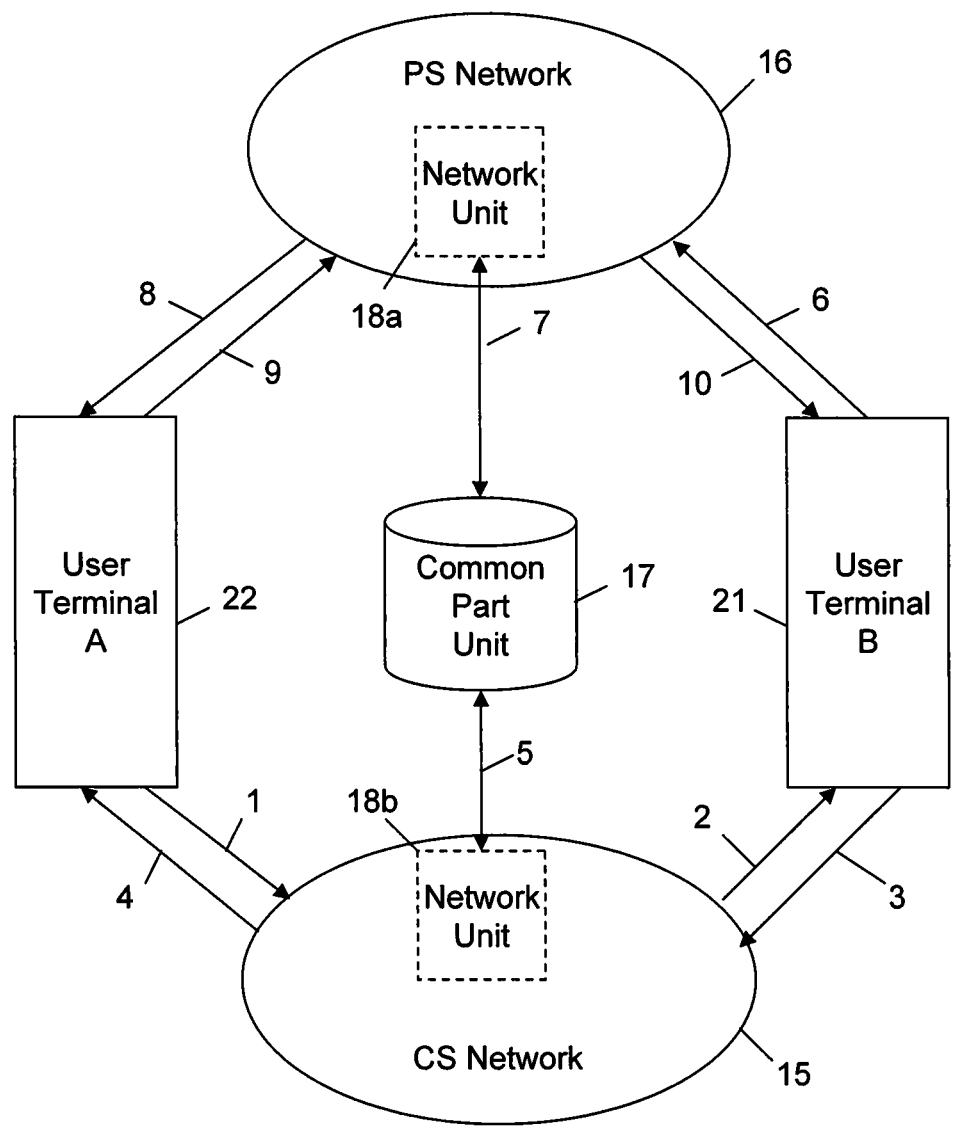

METHOD AND NETWORK UNIT FOR SETTING UP A CONNECTION IN A SECOND NETWORK

FIELD OF THE INVENTION

The present invention relates to a method for setting up a connection in a second network from a first (initiating) user terminal to a second user terminal, when a connection in a first network is present between the first user terminal and at least the second user terminal. In a further aspect, the present invention relates to a network unit arranged for setting up a connection in a second network from a first user terminal to a second user terminal, when a connection in a first network is present between the first user terminal and at least the second user terminal.

PRIOR ART

In present day mobile telecommunications networks, it is possible for a user, when involved in a voice call with another user, to set up a connection of a different type.

For example, a user may set up a session initiation protocol (SIP) type of connection in a packet switched (PS) network during an ongoing circuit switched (CS) call. For this, the user must know the direct address of the other party in the other type of network, in this case the SIP uniform resource identifier (SIP-URI). If the user (as calling party) has stored the SIP-URI of the called party (e.g. in the contact list in the phone), this SIP-URI can be used directly for the set up of the SIP-session. If the user (as calling party) does not know the SIP-URI, the MSISDN (Mobile Station ISDN Number) as used in the CS call set up can be used to form a telephone URI (tel:URI), which is an example of an indirect address. The SIP-session can be set up in the second network using this tel:URI indirect address. If the user (as called party) does not know the SIP-URI, the Calling Line Identity (CLI), as delivered by the CS signalling, can be used to form a tel:URI, as above.

When the user (as called party) does not know the MSISDN of the other party (e.g. due to Calling Line Identity Restriction, CLIR) the user cannot use any of the above methods to create a SIP-URI based on the MSISDN (indirect address) or a real SIP-URI (direct address). When the user (as calling party) does know the used MSISDN during call set up, but the call is diverted and no connected number is received (e.g. due to Connected Line Restriction, COLR), the user can not use any of the above mentioned methods to create a SIP-URI based on the MSISDN. As a result, this user is not able to set up the connection in the second network.

The above example refers to a connection in a first network, in which the connection is a CS network and the second network is a PS network. The same problem may however also occur when a connection exists in a PS network (now first network), e.g. when two users are involved in a chat session, in which the users are only known by their nicknames. In this case, none of the users are able to set up a connection in a second network, e.g. a voice call in a CS network, as the direct addresses (MSISDN) in the second network (CS network) are not known.

SUMMARY OF THE INVENTION

The present invention seeks to provide a method for setting up a connection in a second network, which can be used in all circumstances, even when a direct or indirect address of the called party is unknown or unavailable.

According to the present invention, a method according to the preamble defined above is provided, the method comprising initiating the connection in the second network using a context dependent second network address, the context dependent second network address identifying a combinational service in the second network, the combinational service comprising retrieving the second network address of the second terminal using a common part of the first and second network, and completing the set up of the second connection using the second network address of the second terminal. The context dependent second network address identifies a combinational service in the second network, and is not a direct or indirect address of the second terminal. The common part of the first and second network enables the sharing of information used in the first network (but not always known or visible to one or more of the user terminals) related to the connection in the first network, with the second network. For example, when a CS call exists between two user terminals in a CS network, a context dependent second network address may be used as part of a SIP INVITE message in the second network. This triggers the combinational service in the second network to start retrieving the address necessary for setting up the connection in the second network.

In a further embodiment, the combinational service further comprises:
retrieving the second network address of the first user terminal (e.g. an IP address of a user terminal my be retrieved from a SIP INVITE message used to initiate the connection in the second network);
retrieving the first network address of the first user terminal from the common part of the first and second network (e.g. an MSISDN of the first user terminal may be retrieved from e.g. a Home Location Register), and
retrieving the first network address of the second user terminal from the first network using a reference to the connection in the first network. E.g. the MSISDN of the first user terminal may be sufficient to retrieve the MSISDN of the second user terminal having an ongoing call connection in the first network.

When the first user terminal is involved in a single connection in the first network, the reference to the connection in the first network in a further embodiment comprises the first network address of the second terminal. In this case, in the above example, the MSISDN of the first user terminal suffices to identify the associated call and hence the associated second user terminal identification.

When the first user terminal is involved in more than one connection in the first network, in a further embodiment, the reference to the connection in the first network comprises a call reference number (CRN) identifying the connection in the first network between the first user terminal and second user terminal. E.g. the CRN may be included in the SIP INVITE message.

Alternatively, when the first user terminal is involved in more than one connection in the first network, the reference to the connection in the first network is obtained by correlating a request for setting up the connection in the second network with a first network message associated with the connection in the first network. E.g. the first user terminal may be arranged to send a mid call trigger in the first network, at the same time when the SIP INVITE message is issued towards the second network. In the common part, these two events can be detected and associated with each other.

In a further embodiment, the first and second network addresses of the second user terminal are suppressed in the connections towards the first user terminal. This allows to hide the identity of the second user terminal when desired, e.g. for reasons of privacy.

The first network may be a circuit switched network (e.g. for a voice connection) and the second network may then be a packet switched network in a further embodiment. The PS network e.g. allows SIP sessions to be made between the first and second user terminal.

The present invention may also be applied when the first network is a packet switched network and the second network is a circuit switched network. E.g., when two user terminals are engaged in a chat session (connection in first network), and only the associated nicknames are known in the user terminals, the present method may be used to set up a voice connection in the CS network, without the need that the CS addresses are known to the user terminals.

In a further aspect, the present invention relates to a network unit according to the preamble defined above, in which the network unit is connectable to a common part of the first and second network, the network unit being arranged to initiate the connection in the second network upon receiving a context dependent second network address from the first user terminal, the context dependent second network address identifying a combinational service, the combinational service comprising retrieving the second network address of the second terminal using the common part, and completing the set up of the second connection using the second network address of the second terminal.

The network unit may further be arranged to implement any one of the above described method embodiments, where necessary with the proper interfacing hardware to other network elements.

In an even further aspect, the present invention relates to a common part unit which is accessible for both a first network and a second network, and which is arranged to store information relating to a connection in a first network between a first user terminal and at least a second user terminal, the common part unit further being arranged to provide upon request the second network address of the second terminal to allow the set up of a connection in the second network between the first user terminal and the second user terminal. Such a common part unit is able to perform a part of the functionality of the present method embodiments. E.g. the common part unit is further arranged to correlate a request for setting up the connection in the second network with a first network message associated with the connection in the first network.

Also, the present invention relates to a telecommunication system comprising a first network and a second network, and a network unit according to an embodiment of the present invention for allowing the set up of connection between two user terminals in the second network. The telecommunication system may further comprise a common part unit according to the present invention.

The present invention also relates to a computer program product comprising computer executable code, which when loaded on a network unit having a processor and memory means, provides the network unit with the ability to perform the method according to any one of the embodiments of the present invention.

SHORT DESCRIPTION OF DRAWINGS

The present invention will be discussed in more detail below, using a number of exemplary embodiments, with reference to the attached drawing, in which the sole FIGURE shows a schematic diagram of two terminals involved in a connection in a first type of network, in which a connection in a second type of network is being set up.

DETAILED DESCRIPTION OF EXEMPLARY EMBODIMENTS

In the FIGURE, a schematic diagram is shown of two user terminals 21, 22, which are able to establish a connection between each other using a circuit switched (CS) network 15 and/or a packet switched (PS) network 16. The CS network 15 and PS network 16 may e.g. be formed by mobile telephony networks, e.g. a GSM network 15 and a GPRS network 16. The CS network 15 and PS network 16 may share a common part or common part unit 17, e.g. a database accessible from both the CS network 15 and PS network 16. A network unit 18a/18b connects to the common part 17. The network unit is shown in phantom because it may be located in either the CS network 15 or the PS network 16, depending on which network is setting up the second connection. When the active connection is in the CS network (then first network), the network unit 18a in the PS network (then second network) is addressed with the context dependent second network (PS) address and the network unit 18a takes care of setting up the connection between the two terminals in the second (PS) network. However, when the active connection is in the PS network (then first network) the network unit 18b in the CS network (then second network) is addressed with the context dependent second (CS) network address and the network unit 18b takes care of setting up the connection between the two terminals in the second (CS) network.

Set up of a CS-call between user terminal 22 (A) and user terminal 21 (B), is accomplished by steps 1 . . . 4 as indicated in the FIGURE. The user terminal 22 initiates a call towards the CS network 15 (step 1), which then alerts the other user terminal 21 (step 2). When the user terminal 21 answers, the CS network 15 is notified (step 3), which then forwards the answer signal to user terminal 22 (step 4). During the set up of the CS-call, the CS network 15 stores information of the call (such as Calling Party Number or Calling Line Identity, Connected Line Identity, Call Reference Number, . . . ) in such a way, that services in both the CS network 15 and PS network 16 can read this information. The CS call information may be stored in the common part unit 17 (step 5). Note that although Calling Line Identity and Connected Line Identity may be suppressed by the calling or connected party, these identities are still available on ISUP (ISDN User Part), and hence may be stored in the common part unit 17.

The Call Reference Number may be reported to the calling user terminal 22 (step 4) and the called user terminal 21 (step 2) in the CS-call.

The PS network 16 contains information, which can be used to determine the IP-address of a user terminal 21, 22, based on the CLI of the user terminal.

During the existence of the CS call between user terminal 22 and user terminal 21, one of the parties involved (e.g. user terminal 21 (B)) may be desiring to set up a further, different type of connection between the two user terminals 21, 22 using a different network, e.g. a session initiation protocol (SIP) session using the PS network 16.

When a user terminal 21, 22 wants to add e.g. a SIP-session to an ongoing CS-call (voice conversation), the user terminal 21, 22 must know the SIP-URI (SIP Uniform Resource Identifier) of the other user terminal 21, 22. The same occurs when the calling/called user terminal 21, 22 may want to send an Instant Message to its call partner user terminal 21, 22.

If the user terminal 21, 22 (as calling party) has stored the SIP-URI of the other user terminal 21, 22 (called party), e.g.

in the contact list in the user terminal, this SIP-URI can be used directly for the set up of the SIP-session in the PS network 16.

If the user terminal 21, 22 (as calling party) does not know the SIP-URI, the MSISDN of the other user terminal 21, 22 (as used in the CS call set up) can be used to form a tel:URI. The SIP-session can then be set up in the PS network 16 using this tel:URI.

If the user terminal 21, 22 (as called party) does not know the SIP-URI, the Calling Line Identity (CLI), as delivered by the CS signalling, can also be used to form a tel:URI, as above.

When the user terminal 21, 22 (as called party) does not know the MSISDN of the other user terminal 21, 22 (as calling party), e.g. due to Calling Line Identity Restriction (CLIR), the user terminal 21, 22 cannot use any of the above methods to create a SIP-URI based on the MSISDN.

When the user terminal 21, 22 (as calling party) does know the used MSISDN during call set up, but the CS call is diverted and no Connected Number is received (due to e.g. Connected Line Identity Restriction, COLR), the user terminal 21, 22 also can not use any of the above mentioned methods to create a SIP-URI based on the MSISDN.

Various embodiments of the method according to the present invention may be used to allow set up of a SIP session between the two user terminals 21, 22 even in these circumstances.

During set up of the SIP-session (step 6), the user terminal 21 (B) sends a SIP INVITE message with a context dependent address like sip:call_partner@call_partner.mytelco.com, where "call_partner.mytelco.com" identifies a service in the PS network 16, that assists the user terminal 21 to set up a SIP-session to an "unknown" party (user terminal 22 (A)).

The service in the PS network 16 then translates this context dependent address into a "real address" (e.g. a direct address such as John.Smith@telco.com), that can be used to eventually deliver the INVITE to the user terminal 22 (step 8). The format that must be used depends on the information that is available in the sending terminal (in this case user terminal 21 (B) and the capabilities of the combined network, i.e. common part 17.

The service in the PS network 16 (triggered by the identification "call_partner.mytelco.com" in the SIP INVITE message) can determine the IP-address of the user terminal 21 (B), which originated the SIP INVITE message.

By interrogating a function in the common part 17 (e.g. a home location register HLR), the service in the PS network 16 can find the MSISDN of the user terminal 21 (B), based on the known IP-address of the user terminal 21 (B). The service in the PS network 16 then queries the CS network (step 7) for the parties that are involved in the call, identified by this known MSISDN. When the B-party has only one CS-call ongoing, the MSISDN (of the B-party) is enough identification for the ongoing call. In case this ongoing CS-call has only two participants, the MSISDN of the other user terminal 22 (A) can be read from the ongoing CS-call data. Then, the HLR (in common part 17) can be interrogated to find the IP-address of the user terminal 22 (A), belonging to the MSISDN of the A-party. In this case the format sip:call_partner@call_partnermytelco.com is enough as a context dependent address. The service in the PS network 16 can now deliver the INVITE at the user terminal 22 (A) as indicated in step 8 in the FIGURE. After that, the user terminal 22 (A) responds with a SIP OK message (step 9), which allows the service in the PS network 16 to relay a SIP OK message to the originating user terminal 21 (B) as indicated by step 10.

When the user terminal 21 (B) has more then one ongoing CS-call, the user terminal 21 (B) must provide an identification of the intended ongoing CS-call in the relative address in the initial SIP INVITE message towards the PS network 16 (step 6). In an embodiment, this identification can be the Call Reference Number (as can be provided by the CS network 15 to the user terminal 21 (B).

In general terms, the context dependent address may have the form of: sip:<some_identification_of CS_call>@call_partner.mytelco.com, in which "<some_identification_of CS_call>" identifies the ongoing CS-call, such as the CRN. An even further possibility for the context dependent address is sip:<some_identification_of CS_call><me>@call_partner.mytelco.com, in which <me> identifies the user terminal 21 (B) that requests the use of the context-dependant SIP-URI.

In a further embodiment, another alternative is used for identifying the correct CS-call between user terminal 22 (A) and user terminal 21 (B). When the user terminal 21 (B) simultaneously sends the SIP INVITE message (via the PS network 16) and a CS mid call trigger (via the CS network 16) within the context of the intended ongoing CS call between user terminal 22 (A) and user terminal 21 (B), a combinational service in the common part 17 can correlate these two signals and obtain the needed call reference.

In all of the embodiment above, the requested privacy of a user terminal 21, 22 may be maintained. When the user terminal 22 (A) has requested privacy (by not disclosing the CLI to the user terminal 21 (B)), the combinational service in PS network 16 should take care that the PS-traffic to the user terminal 21 (B) does not contain any information (e.g. IP-address or SIP-URI) that can be related to the user terminal 22 (A). The SIP-URI in the messages towards user terminal 21 (B) then are composed e.g. "call_partner @ call_partner.mytelco.com" and the IP-address should be hidden by the PS-network 16.

The present invention can also be used e.g. to send an Instant Message from one of the user terminals 21, 22 to the other user terminal 21, 22 of which the actual address is unknown, in a similar manner as described with respect to the above embodiments.

Also, a similar combinational service embodiment may be used to assist setting up a CS call (in CS network 15) between two user terminals 21, 22, which are engaged in a SIP session (in PS network 16). E.g. when two user terminals 21, 22 are involved in a chat session, and each is identified only by a nickname (which is sufficient in the PS network 16), a CS-call can be set up using a context dependent address (e.g. *322#). This context dependent address (a service code) requests the combinational service according to the present invention to determine the MSISDN of the unknown user terminal 22 (the MSISDN of the originating user terminal 21 being known from the action using the relative address) and to set up the CS-call between the user terminals 21, 22.

A service as described above with reference to the various embodiments, may be implemented in a network unit which is part of the respective CS or PS network 15, 16. E.g. the network unit may be provided with a processor and memory, into which computer executable code is loaded, as known to the skilled person. The computer executable code may be provided on a computer program product and loaded in the network unit's memory in a well known manner.

The invention claimed is:

1. A method for setting up a connection in a second network from a first user terminal to a second user terminal, when a connection in a first network is ongoing between the first user terminal and at least the second user terminal, and the first user terminal does not know a second network identity of the second user terminal, the method comprising:

initiating the connection in the second network by the first user terminal, wherein the first user terminal sends an invitation to a context dependent second network address of a network unit providing a combinational service in the second network, the invitation including a second network identity of the first user terminal;

interrogating a common part unit by the network unit providing the combinational service in the second network to retrieve the first network identity of the first user terminal, wherein the common part unit is accessible by both the first network and the second network, and the network unit interrogates the common part unit utilizing the second network identity of the first user terminal;

interrogating a node handling the connection in the first network by the network unit providing the combinational service in the second network to retrieve the first network identity of the second user terminal involved in the ongoing connection with the first user terminal in the first network, wherein the network unit interrogates the node in the first network utilizing the first network identity of the first user terminal;

interrogating the common part unit by the network unit providing the combinational service in the second network to retrieve the second network identity of the second user terminal, wherein the network unit interrogates the common part unit utilizing the first network identity of the second user terminal; and setting up the connection in the second network using the second network identity of the second terminal.

2. The method according to claim 1, wherein the first terminal is involved in more than one connection in the first network, and the step of interrogating the node handling the connection in the first network by the network unit providing the combinational service in the second network to retrieve the first network identity of the second user terminal also includes interrogating the node in the first network utilizing a call reference number identifying the connection in the first network between the first user terminal and second user terminal.

3. The method according to claim 1, wherein the first terminal is involved in more than one connection in the first network, and the node in the first network identifies the second user terminal by correlating a request for setting up the connection in the second network with a first network message associated with the connection in the first network.

4. The method according to claim 1, wherein the first and second network identities of the second user terminal are suppressed in the connections towards the first user terminal.

5. The method according to claim 1, wherein the first network is a circuit switched network and the second network is a packet switched network.

6. The method according to claim 1, wherein the first network is a packet switched network and the second network is a circuit switched network.

7. A network unit for setting up a connection in a second network from a first user terminal to a second user terminal, when a connection in a first network is ongoing between the first user terminal and at least the second user terminal, and the first user terminal does not know a second network identity of the second user terminal, wherein the network unit provides a combinational service in the second network and is connected to a common part unit accessible by both the first network and the second network, the network unit comprising:

a processor; and a non-transitory memory device in communication with the processor or storing computer program instructions;

wherein, when the processor executes the computer program instructions, the network unit is caused to:

initiate the connection in the second network upon receiving an invitation message from the first user terminal addressed to a context dependent second network address of the combinational service provided by the network unit in the second network, the invitation including a second network identity of the first user terminal;

interrogate the common part unit to retrieve the first network identity of the first user terminal, wherein the common part unit is accessible by both the first network and the second network, and the network unit interrogates the common part unit utilizing the second network identity of the first user terminal;

interrogate a node handling the connection in the first network to retrieve the first network identity of the second user terminal involved in the ongoing connection with the first user terminal in the first network, wherein the network unit interrogates the node in the first network utilizing the first network identity of the first user terminal;

interrogate the common part unit to retrieve the second network identity of the second user terminal, wherein the network unit interrogates the common part unit utilizing the first network identity of the second user terminal; and set up the connection in the second network using the second network identity of the second terminal.

8. The network unit according to claim 7, wherein the first terminal is involved in more than one connection in the first network, and the network unit in the second network interrogates the node in the first network to retrieve the first network identity of the second user terminal also utilizing a call reference number identifying the connection in the first network between the first user terminal and second user terminal.

9. The network unit according to claim 7, wherein the first terminal is involved in more than one connection in the first network, and the network unit is further arranged to identify the second user terminal by correlating a request for setting up the connection in the second network with a first network message associated with the connection in the first network.

10. The network unit according to claim 7, wherein the network unit is further arranged to suppress the first and second network addresses of the second user terminal in the connections towards the first user terminal.

11. The network unit according to claim 7, wherein the network unit is part of a packet switched network.

12. The network unit according to claim 7, wherein the network unit is part of a circuit switched network.

13. A common database unit which is accessible from both a first network and a second network, the common database unit comprising:

a processor; and a non-transitory memory device in communication with the processor for storing computer program instructions;

wherein, when the processor executes the computer program instructions, the common database unit is caused to:

store information relating to a connection in a first network between a first user terminal and at least a second user terminal, the information including a first network identity of the first user terminal and a first network identity of the second user terminal;

provide upon receiving a first request from a network unit providing a combinational service in the second network, the first network identity of the first user terminal, the first request including a second network identity of the first user terminal;

provide upon receiving a second request from the network unit providing the combinational service, the first network identity of the second user terminal involved in the ongoing connection with the first user terminal in the first network, the second request including the first network identity of the first user terminal; and provide upon receiving a third request from the network unit providing the combinational service, the second network identity of the second user terminal, the third request including the first network identity of the second user terminal, thereby enabling the network unit providing the combinational service to set up a connection in the second network between the first user terminal and the second user terminal when the first user terminal does not know the second network identity of the second user terminal.

14. The common database unit according to claim 13, wherein the processor also causes the database unit to correlate a request for setting up the connection in the second network with a first network message associated with the connection in the first network.

\* \* \* \* \*

UNITED STATES PATENT AND TRADEMARK OFFICE
CERTIFICATE OF CORRECTION

PATENT NO. : 8,442,038 B2
APPLICATION NO. : 12/096339
DATED : May 14, 2013
INVENTOR(S) : den Hartog et al.

Page 1 of 1

It is certified that error appears in the above-identified patent and that said Letters Patent is hereby corrected as shown below:

In the Specifications

In Column 2, Line 28, delete "my be" and insert -- may be --, therefor.

In Column 5, Line 61, delete "partnermytelco.com" and insert -- partner.mytelco.com --, therefor.

In Column 6, Line 1, delete "more then" and insert -- more than --, therefor.

In the Claims

In Column 8, Line 3, in Claim 7, delete "or" and insert -- for --, therefor.

Signed and Sealed this
Sixth Day of August, 2013

Teresa Stanek Rea
*Acting Director of the United States Patent and Trademark Office*